Figure 1:
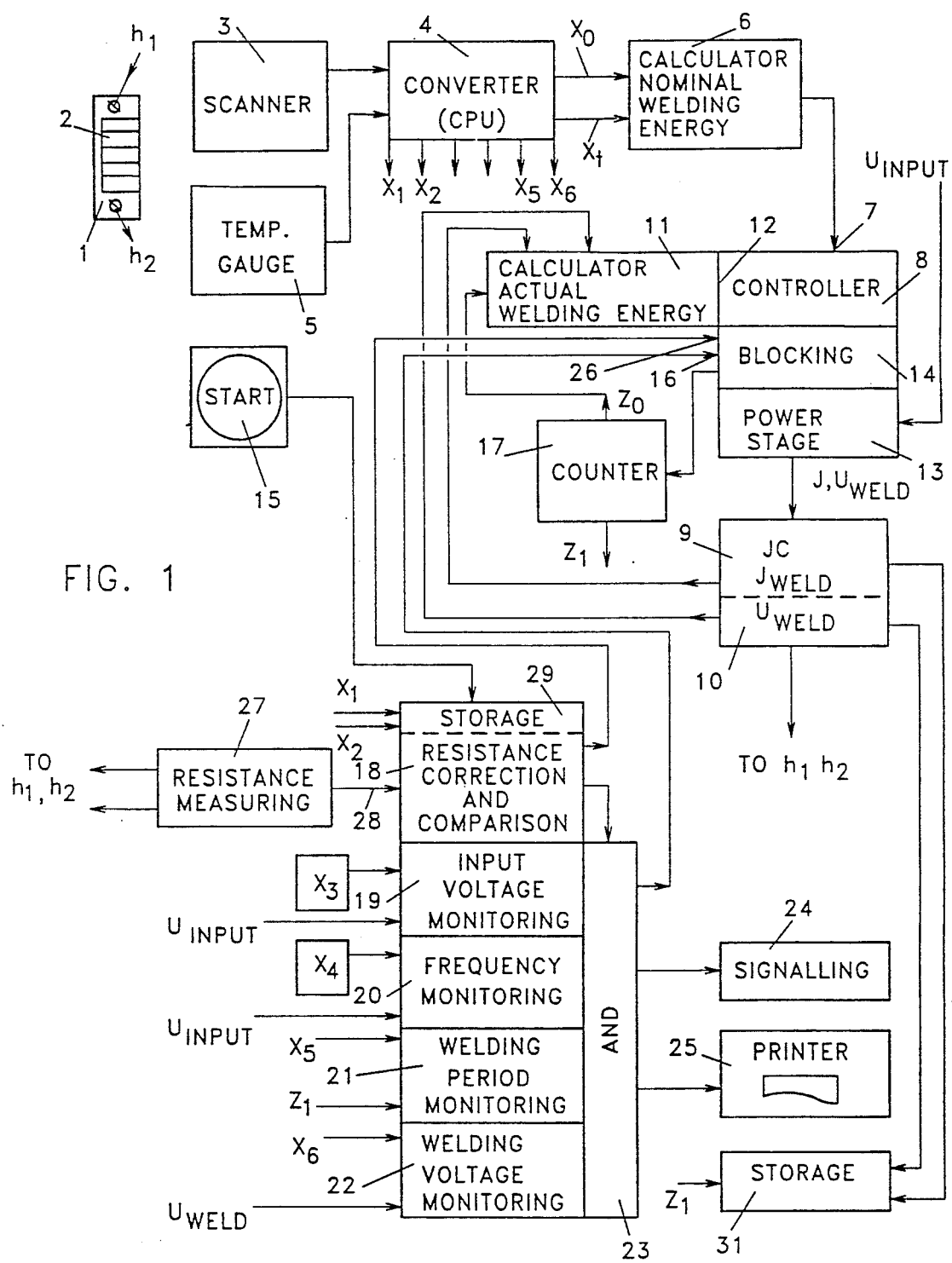

United States Patent [19]
Merle

[11] Patent Number: 5,130,518
[45] Date of Patent: Jul. 14, 1992

[54] ELECTRIC WELDING APPARATUS FOR AUTOMATICALLY WELDING HEATING COIL FITTINGS

[75] Inventor: Bernd Merle, Alsfeld-Eudorf, Fed. Rep. of Germany

[73] Assignee: Hürner GmbH, Frankfurt am Main, Fed. Rep. of Germany

[21] Appl. No.: 322,153

[22] Filed: Mar. 10, 1989

[30] Foreign Application Priority Data

Mar. 30, 1988 [DE] Fed. Rep. of Germany ....... 3810795

[51] Int. Cl.$^5$ ............................................. H05B 1/02
[52] U.S. Cl. ................... 219/497; 219/535; 219/492; 219/505; 156/274.2; 156/273.9; 285/286
[58] Field of Search ............... 219/533, 544, 506, 492, 219/497, 501, 505; 156/272.11, 273.9, 274.2, 272.2; 285/280, 286, 292; 264/272.11

[56] References Cited

U.S. PATENT DOCUMENTS

| | | | |
|---|---|---|---|
| 4,571,488 | 2/1986 | Reeves | 219/535 |
| 4,631,107 | 12/1986 | Ramsey | 219/497 |
| 4,684,789 | 8/1987 | Eggleston | 219/535 |
| 4,705,937 | 11/1987 | Marek | 219/535 |
| 4,795,877 | 1/1989 | Bridgstock et al. | 219/535 |
| 4,837,424 | 6/1989 | Nussbaum et al. | 219/535 |

FOREIGN PATENT DOCUMENTS

| | | |
|---|---|---|
| 153298 | 8/1985 | European Pat. Off. . |
| 1822997 | 12/1960 | Fed. Rep. of Germany . |
| 1615216 | 6/1970 | Fed. Rep. of Germany . |
| 1790161 | 1/1972 | Fed. Rep. of Germany . |
| 3545158 | 6/1987 | Fed. Rep. of Germany . |
| 2572326 | 5/1986 | France . |

Primary Examiner—Mark H. Paschall
Attorney, Agent, or Firm—William A. Behare

[57] ABSTRACT

In an electric welding apparatus for automatically welding heating coil fittings substantially of plastic material a scanner (3) for scanning fitting data is connected via a converter to a first input of a controller (8) which via a power station (13) controls, for a welding period, the welding power output. In order to reach an optimal welding factor of the welding the scanner (3) and the converter (4) are provided for scanning naominal welding energy data of said fitting (1). At least a second input (at 12) of the controller (8) is connected to circuits (calculator 11) which generate signals of the actual welding energy from welding power output data as well as from the actual welding period.

12 Claims, 1 Drawing Sheet

ELECTRIC WELDING APPARATUS FOR AUTOMATICALLY WELDING HEATING COIL FITTINGS

The invention relates to an electric welding apparatus for automatically welding heating coil fittings as in accordance with the preamble of claim 1.

For connecting plastic tubes, particularly gas conducting tubes of plastic material, fittings have according to the prior art hitherto been used which also substantially consist of plastic material and which include, on the inner surface thereof, an electric coil of conductive material. In order to connect the tube ends by means of the fitting, the coil is provided with such a high welding current that the plastic material in the fitting and on the tube ends can melt and, subsequently, can harden. The plastic parts are, in particular, made of poly ethylene.- One problem of this welding process, which may also be understood as a heat sealing process, consists in the correct melting degree of the plastic material. If the latter melts too little, the connection of the tube ends tends to be untight. On the other hand, too strong melting of the plastic material may lead to undesired deformations and may even partly burn the fitting. Which makes it more difficult is that the welding should be optimized for different tube diameters and fitting diameters and that at the same time the material properties of the various plastics have to be taken into consideration. The internal pressure, too, which the welded tubes have to withstand in operation, may be considered in the adjustment of an optimum welding factor. To this end, the ambient temperature during the course of the welding process is taken into consideration as well.

In an electric welding device known in practice, the welding period is given in dependence from the data of the tube to be welded and from the ambient temperature, which welding period is variably formed from an incrementally formed base period from the ambient temperature. The welding voltage, which drives the welding current through the coil of the fitting is given in dependence from the data of the fitting, particularly the diameter thereof and independently from the formation of the welding period is kept constant. A disadvantage is that the voltage from generators which generate the welding current may have different curve shapes which deviate from the ideal sinusoidal shape. The control of the voltage, however, is based on a measurement which requires a sinusoidal shape at a particular frequency. Therefore, such a device may adjust to a voltage which is not suited for the optimum welding factor. In this case, switch-off of the voltage is time-controlled independently therefrom. The switch-off cannot, without problems, be subjected to controllable errors because the data determining the time are entered by buttons into the electric welding apparatus. In this way, the internal pressure of the tube, the ambient temperature and the tube diameter are entered. It is therefore a disadvantage of this prior art electric welding device that by wrong voltage measurement and/or false entry by means of buttons, there might be a danger that welding is not optimally accomplished while not permitting any direct control thereof.

In a prior art electric welding apparatus referred to in the beginning, entry errors are substantially avoided in that the electric welding apparatus includes a scanner for an identity card, which is connected to the heating coil fitting, and from the latter scans the data to be processed by the electric welding apparatus. These data may be entered, via a pulse shaper and a decoder as well as a test circuit for the data read, to the input of a control, which controls the measuring current. In general, the control device should regulate the intensity and the period of the heating or welding process. By means of the scanner, the parameters, such as the diameter of the heating coil fitting, the wall thickness, electric resistance of the heating coil, fitting length, kind of the plastic material, entered from the identity card, for instance in the shape of a bar code, into the control may be scanned. By means of an ambient temperature gauge, furthermore, the temperature of the heating coil fitting is determined at the beginning of the welding process and is entered as an electric signal into the input of the control in which the welding program is changed according to the measured temperature. Outputs of the control are connected to a power stage which generates the welding current for the heating coil fitting, and to monitoring circuits which are connected to indicator means for the operation data. The welding current is fed back via a feedback loop to the control and also fed into the monitoring circuits. In case of disturbance of the welding process, the monitoring circuits generate signals which are shown by the indicator means and by means of a switch will stop the current operation (French Pat. No. 2,572,326). In this electric welding apparatus, it might be of disadvantage that the formation and change of the welding program is performed in the control in which a plurality of individual parameters have been fed that have to be linked to yield the welding program, so that the controller may, based on the approximately optimal welding factor, regulate, via the welding current and the welding period, the welding capacity.

It is therefore the aim of the present invention to provide an electric welding apparatus which permits, at a high security, orderly welding at an approximately optimal welding factor while complicated formation or change of a welding program is no longer necessary.

The problem is solved by the construction of an electric welding apparatus comprising the features revealed in the characterizing portion of claim 1.

The solution principle consists in that in this electric welding apparatus, the magnitude decisive for the optimum welding factor, that is the nominal welding work (energy) is via scanning directly fed and that in the controller, this nominal welding work (energy) is compared with the respective actual welding work (energy) so that the welding is finished when the actual welding work has reached the nominal welding work. By scanning, particularly, of a bar code which includes the nominal welding work data, errors in the entry cannot, practically, occur. The actual welding work may be obtained by technically uncomplicated means according to claim 3 according to which at least one integrated circuit is connected as effective value meter of the welding voltage and of the welding current to a calculator forming the welding capacity. In the calculator, the effective values referred to need only be multiplicatively linked.

In order to obtain a still better approximation of the optimum welding factor and to obtain the advantages of a safe data collection in the electric welding apparatus and the uncomplicated control, the welding apparatus according to claim 2 is characterized by an ambient temperature gauge as well as a calculator which is fed, by the scanner via the converter, with standardized nominal welding work data of the fitting and which feeds signals of a temperaturecorrected nominal welding capacity to the further input of the control. That means that by the ambient temperature gauge, the standardized nominal welding work, i.e. the nominal welding work referred to a particular reference temperature, is corrected depending on the actual ambient temperature. As for the rest, the regulation of the welding capacity via the welding current as well as the welding period is as simple as according to the principle referred to in the beginning.

While the nominal welding work constitutes a parameter, primarily determining the control of the welding capacity, further parameters for safeguarding orderly welding also under unfavorable conditions are only secondarily obtained and assessed in order to block or stop the welding process if determined boundary values are exceeded. In addition, automatic fixation of such deviations, or disturbances, in the form of a protocol is provided.

According to claim 4, the electric welding apparatus is so shaped that the welding process will not start before the heating coil fitting connected has indeed a resistance value of the heating coil which is practically identical to the predetermined value. To this end, it has been provided that the scanner for scanning the fitting data detects, via the converter, data of the nominal resistance of the fitting related to a reference temperature of particularly 20° C. as well as a temperature factor of the resistance and stores them in a storage, that correction and comparison means connected to the ambient temperature gauge is connected to the storage as well as to a resistance measuring circuit connected to the fitting, compares the actual resistance measured therewith with the nominal resistance converted to the ambient temperature and in case of deviation from a tolerance triggers blocking means. That means that the welding process cannot start before it has been verified that the heating coil fitting is in order, i.e. has the resistance value predetermined but does not show any short-circuit or breakage.

For monitoring secondary magnitudes or parameters furtheron according to claims 5 and 7, structural measures have been provided by which boundary values of the welding voltage as well as the welding period are scanned and compared with the respective actual values. Fixed determined boundary values of the input voltage and the frequency thereof, on the other hand, are fixedly stored in the device and compared with the actual values detected therein. If one of the actual values falls below the respective lower boundary value or exceeds the upper boundary value, blocking means is triggered, which stops the welding process. According to claim 8, furtheron, there is provided, together with the signalling means, a signal and a printout by a printing recorder.

According to claim 9 it is possible to intermediately store the actual data of the welding process in non-fugitive storages and to print them by the printing recorder.

The invention also comprises heating coil fittings to be used in one of the electric welding apparatusses according to the invention as described in the foregoing, where the data to be scanned by the scanner of the electric welding apparatus are provided on the heating coil fitting in the form of a bar code.

In the following, the invention will be described in more detail based on a drawing including one figure wherein a sketched block diagram of the electric welding apparatus is shown.

In FIG. 1, a heating coil fitting provided for welding with plastic tubes has been referred to by the numeral 1. It comprises terminals h1 and h2 connected to its heating coil. On the outer side thereof, a label 2 including data in the form of a bar code is provided.

The data may be scanned by a scanner 3 being part of the electric welding apparatus, which scanner may particularly be shaped as a light pen. One output of the scanner is connected to a converter 4 which converts and decodes the scanned data for further processing. Outputs of the converter are designated by X0 through X6. Each of these outputs is assigned to predetermined data by the internal organisation of the converter. The converter may particularly be realized by a small central calculating unit. One further input of the converter is connected to a temperature gauge 5 which measures the respective ambient temperature.

By means of scanner 3, a particularly standardized, nominal welding work is scanned from the bar code of the label for the respective fitting, which is fed from output X0 of converter 4 into a calculator 6 for forming a temperature-corrected nominal welding work. To this end, the ambient temperature of the fitting is measured by the temperature gauge and via converter 4 is also fed via duct $X_t$ into calculator 6. Signals corresponding to the temperature-corrected nominal welding work are fed to a first input 7 as nominal value input of a control 8 which controls the welding capacity for a welding period and thereby adjusts the actual welding work. Regulation is done in detail by controlling the effective value of the welding current while simultaneously controlling the feedback of the welding current and of the welding voltage. The effective values of the welding current and of the welding voltage which are formed by integrated circuits 9, 10 are fed to this end to control 8 connected to a calculator 11 for calculating the actual welding work. Further inputs of the control are provided at an interface 12 between calculator 11 and control 8.

It should be noted that calculator 6 for the nominal welding work, calculator 11 for the actual welding work and control 8 for further functional groups, which will be explained lateron in more detail, may be realized by a micro processor unit comprising internal storages (EPROM and RAM) as well as a sequence control.

Referring again to FIG. 1, an output not shown in detail of control 8 is connected to a power stage 13 delivering the welding current $I_{weld}$ and the welding voltage $U_{weld}$ predetermined by the control. The power stage is to this end provided with an input voltage which has been shown in the drawing only as a portion of the total current supply. Control 8 and power stage 13 are furtheron connected to blocking means 14 which when actuating a starter button 15 initiates the welding current until a signal switching off the welding current from control 8 or an other blocking signal via a blocker input 16 arrives in the blocking means.

The electric welding apparatus furtheron includes a counter 17 fed from a pulse generator not shown which ccunter counts up the welding period as long as a welding current is supplied from power stage 13 and which terminates the counting process when the welding current is stopped by blocking means 14. Outputs of the counter are referred to by Z0 and Z1. From output Z0, a welding time signal is fed to calculator 11. Output Z1 provides an identical welding time signal for a monitoring process, to be discussed lateron, while the abovereferenced structure substatially serves for the prime recording of the nominal welding work and the control of the actual welding work based on it.

For the secondary monitoring of various magnitudes, which might be of significance for a safe performance of the welding process, resistance correction and comparison means 18 as well as monitoring means 19 through 22 for the input voltage, the frequency, the welding period and the welding voltage have been provided. The outputs of these monitoring devices are connected together, via an AND member 23, to signalling means 24 which can be realized by a buzzer, a printing recorder 25 and via blocking input 16 to blocking means 14.

By resistance correction and comparison means 18 one can check whether the value scanned from label 2 of the resistance of the heating coil fitting is identical to the actual resistance value since in case of larger deviations no reliable welding may be envisaged although the actual welding work is adjusted by the control equal to the scanned and ambient temperature corrected nominal welding work. For checking the resistance, a resistance measuring circuit 27 is connected to terminals h1 and h2 of the heating coil. The actual value of the resistance so obtained is fed via an input 28 to resistance correction and comparison means 18. The resistance correction and comparison means 18, furtheron, is internally connected to storage 29, to which data taken from the label of the nominal resistance of the fitting referred to a reference temperature as well as a temperature factor of the resistance are read in via converter 4. By means of the temperature factor, the resistance value obtained by resistance measuring means 27 is corrected in resistance correction and comparison means 18 so that the actual resistance value related to the reference temperature can be compared to the nominal resistance referred to the same reference temperature of for instance 20° C. If the result of the comparison is within the boundary values, which are also referred to as tolerance values, the welding process is released via a release input 30 of blocking means 14. When in the reverse case, the converted actual resistance obtained is not correct, blocking via AND member 23 and blocking input 16 of blocking means 14 occurs.

Monitoring of the input voltage, which is fed to an input of input voltage monitoring means 19 is furtheron provided by comparison with solidly predetermined boundary values of the input voltage which are supplied as data from a storage X3 to input voltage monitoring means 19. The input voltage is furtheron monitored as to its frequency in basically the same manner by frequency monitoring means 20. To this end, the boundary values of the frequency stored in a storage X4 are fed to a respective input of the frequency monitoring means. Input voltage monitoring means 19 as different from welding voltage monitoring means 22 can be provided as a voltage peak value monitoring means. Welding voltage monitoring means 22 receives at one input the effective value of welding voltage $U_{weld}$ and, at a further input, the respective boundary values scanned from label 2 of the welding voltage appearing at output X6 of converter 4. By welding period monitoring means 21, the actual welding period which is counted by counter 17 and appears at its output Z1 is compared with the boundary values of the welding period which are fed from an output X5 of converter 4 to the welding period monitoring means. By the comparison of the actual welding period with the boundary values of the nominal welding period, it can additionally be checked whether failures occurred such as heating coil short circuit or inefficient electric contacting of the heating coil when welding. By this and by monitoring the other parameters referred to by input voltage monitoring means 19, by frequency monitoring means 20, and by welding voltage monitoring means 22, the best-possible welding results can be guaranteed.

By means of printer 25, not only deviations exceeding the boundary values of the monitored operation parameters, such as the input voltage and the welding voltage, the frequency of the input voltage as well as the welding period are recorded so that manipulation of the welding by rewelding can be taken from the printed-out protocol, but also the normal functions of the electric welding apparatus. To this end, inter alia, the welding voltage and the welding current as well as the welding period are intermediately stored in a non-fugitive storage 31. Storage 31 supplies the intermediately stored values, when printing the protocol by printer 25, to the printer; such print-out may be made at any given time intervals, for instance daily, since the values as printed-out are given by means not shown, an identification number as well as the date and the time of each welding operation.

By a sequence control not shown in detail, the data stored in the bar code of label 2 are scanned and converted whereupon these data can be made visible on an indicator not shown, but if a corresponding control is provided, also by printer 25. At the same time, the electric welding apparatus measures, by means of temperature measuring gauge 5, the ambient temperature and calculates, from the actual resistance of the heating coil measured at the same time by resistance measuring circuit 27, the actual value related to a reference temperature which actual value can be compared with a resistance nominal value. By means of calculator 6, furtheron, the nominal welding work referred to the ambient temperature is calculated which is based on the scanned nominal welding work for a predetermined ambient temperature. The admissible boundaries, too, of the welding period are scanned, if necessary are corrected by the ambient temperature, to which end calculator 6 can serve, too, and fed to an input of welding period monitoring means 21. This input has been shown here as being part of output X5 of converter 4.

After actuation of start button 15, the corrected resistance value read-in is compared with the resistance nominal value in resistance and comparison means 18 and in case of identity within predetermined boundary values, release of the welding process is initiated via release input 26 of blocking means 14. During welding, control 8 regulates welding current $I_{weld}$ as well as welding voltage $U_{weld}$ and hence the welding capacity while considering the welding period of the welding work counted by counter 17. If the actual welding work reaches the nominal welding work fed to input 7, the control, via blocking means 14, switches power stage 13 off. During the welding process, the actual values fed to monitoring means 19 through 22 are constantly monitored. In case of deviation of one of these values from the predetermined boundary values, switch-off of the welding process via blocking means 14 occurs with clear text indication and reference to time and date. By the regular print-outs of the clear text indications by printer 25 the safety of the weldings in toto becomes controllable.

In summary, one aspect of the invention resides in an electric welding apparatus for automatically welding heating coil fittings substantially of plastic material. The apparatus comprises a scanner for scanning fitting data. The scanner is connected via a converter to the input of a controller via a power station, controls for a welding period, the welding power output. The scanner 3 and the converter 4 are provided for scanning the nominal welding energy data of the fitting 1. At least one further input at 12 of the controller 8 is connected to circuits calculator 11 which generate signals of the actual welding energy from the welding power output data, as well as from the actual welding period.

Another aspect of the invention resides in that an ambient temperature gauge 5 as well as a calculator 6 which is fed by the scanner via the converter with standardized nominal welding energy data of the fitting 1, and which feeds signals of a temperature corrected nominal welding energy to the input of the controller 8.

Another aspect of the invention resides in that at least one integrated circuit 9, 10 as the effective value meter of the welding voltage and of the welding current. The integrated circuit is connected to a calculator 11 forming the welding power output data.

Another aspect of the invention resides in that a scanner 3 for scanning the fitting data which detects, via the converter 4, data of the nominal resistance of the fitting 1 which are related to a reference temperature as well as a temperature factor of the resistance and stores them in a storage 29. The storage 29 has a correction and comparison device 18 which is connected to the ambient temperature gauge 5 and is connected to the storage as well as to a resistance measuring circuit 27 connected to the fitting 1, and which compares the actual resistance measured therewith with the nominal resistance converted to the ambient temperature, and in case of a deviation from boundary values triggers blocking means 14.

Another aspect of the invention resides in that the scanner 3 covers the fitting data inclusive of the boundaries of the welding voltage. The voltage monitoring arrangement 22 compares the boundaries of the welding voltage and the actual welding voltage, and when exceeding, or falling short of, the boundaries, triggers the blocking device 14.

Another aspect of the invention resides in that the storages, which store the boundary data of the input voltage as well as the frequency thereof, are connected to the input voltage monitoring arrangement 19 or the frequency monitoring arrangement 20, respectively, which compare the boundary data with the actual data of the input voltage and the frequency and when exceeding, or falling short of, the boundary values, triggers the blocking device 14.

Another aspect of the invention resides in that the scanner that covers the fitting data which include the boundaries of the welding period relative to a nominal welding current and, that the welding period monitoring arrangement 21 is provided, which compares the boundaries with the actual welding period and when exceeding, or falling short of, the boundaries, triggers the blocking device 14.

Another aspect of the invention resides in that a signalling device 24 and a printing recorder 25 are controlled by a resistance correction and comparison device 18 which is connected to a resistance measuring circuit 27, the voltage monitoring arrangement 19, 22, the frequency monitoring arrangement 20 of the ambient temperature gauge and the welding period monitoring arrangement 21.

Another aspect of the invention resides in that the non-fugitive storages 3 have been provided, and in which the actual data of the welding process are stored and which control the printing recorder.

Another aspect of the invention resides in that the data to be scanned by the scanner of the electric welding apparatus is provided in the form of a bar code on the heating coil fitting.

We claim:

1. Electric welding apparatus for automatically welding heating coil fittings which are substantially of plastic material, comprising:
    scanner means for scanning data relative to the nominal welding energy required for welding a heating coil fitting and generating signals representative thereof;
    converter means connected to said scanner means for receiving said signals representative of said nominal welding energy of the heating coil fitting and decoding said signals to generate a value representative of said nominal welding energy;
    controller means connected to said converter means for measuring the actual welding energy consumed when the heating coil fitting is being welded by measuring the actual welding power consumed and the actual welding period;
    said controller means for comparing said value representative of said nominal welding energy with said actual welding energy consumed when the heating coil fitting is being welded; and
    said controller means stopping the welding of the heating coil fitting when said actual welding energy consumed when the heating coil fitting is being welded equals said nominal welding energy.

2. Electric welding apparatus according to claim 1, further including:
    ambient temperature gauge means; and
    calculator means which receives data from said scanner means via said converter means, said data from said scanner means comprising standardized nominal welding energy data of the heating coil fitting with said calculator feeding signals related to the temperature-corrected nominal welding energy to said controller means.

3. Electric welding apparatus according to claim 1, further including:
    at least one integrated circuit for providing the effective value of the welding voltage and of the welding current, said integrated circuit being connected to said controller means.

4. Electric welding apparatus according to claim 2, wherein:
    said scanner means detects data regarding the nominal resistance of the heating coil fitting that is related to a reference temperature and a temperature factor of the resistance and stores the nominal resistance data in a storage means;
    said ambient temperature gauge means being connected to a correction and comparison means, to said storage means and to a resistance measuring circuit which is connected to the heating coil fitting;
    said correction and comparison means comprising the actual resistance measured therewith with the nominal resistance converted to ambient temperature; and said correction and comparison means for triggering blocking means if the difference between the actual resistance measured and the nominal resistance converted to the ambient temperature exceeds a predetermined threshold.

5. Electrical welding apparatus according to claim 1, wherein:

said scanner receives data defining the acceptable boundaries of the welding voltage; and voltage monitoring means is provided which compares the boundaries of the welding voltage and of the actual welding voltage and triggers said blocking means when the actual welding voltage is outside the boundaries.

6. Electric welding apparatus according to claim 5, wherein:

storage elements are provided for storing the boundary data of the input voltage and the frequency thereof with said storage elements being connected to an input voltage monitoring means and frequency monitoring means which compare the boundaries with the actual data of the input voltage and the frequency thereof and triggers said blocking means when the actual data is outside the boundaries.

7. Electrical welding apparatus according to claim 6, wherein:

said scanner means receives data defining the boundaries of the welding period relative to a nominal welding current; and welding period monitoring means is provided which compares the boundaries with the actual welding period and triggers said blocking means when the actual welding period is outside the boundaries.

8. Electric welding apparatus according to claim 6, wherein:

signalling means that is a printing recorder are provided and are controlled by said correction and comparison means and corrected by a resistance measuring circuit, said voltage monitoring means, said frequency monitoring means of said ambient temperature gauge and said welding period monitoring means.

9. Electric welding apparatus according to claim 8, wherein non-destructure storages are provided in which the actual data of the welding process are stored and which control said printing recorder.

10. The electric welding apparatus according to claim 9, further including:

a bar code device having data thereon to be scanned by said scanner means;

said data being related to the nominal welding energy of a heating coil fitting; and said bar code device for being affixed to an exterior surface of a heating coil fitting.

11. A method for controlling the welding of a heating coil fitting comprising the steps of:

determining the nominal welding energy required for the welding of the heating coil fitting;

monitoring the actual welding energy consumed while welding the heating coil fitting; and adjusting the actual welding energy during the welding of the heating coil fitting to correspond to said nominal welding energy required for the welding of the heating coil fitting.

12. The method of claim 11, further including the step of stopping the welding of the heating coil fitting when said actual energy consumed while welding the heating coil fitting equals said nominal energy required for the welding of the heating coil fitting.

* * * * *